United States Patent [19]
Bell

[11] Patent Number: 5,454,577
[45] Date of Patent: Oct. 3, 1995

[54] BICYCLE TRAILER

[76] Inventor: Robert Bell, 16 Oxford Street, Guelph, Ontario, Canada, N1H 2M3

[21] Appl. No.: 323,402

[22] Filed: Oct. 14, 1994

[51] Int. Cl.$^6$ .................................................. B62K 27/00
[52] U.S. Cl. ...................... 280/204; 280/415.1; 280/643; 280/648; 280/656
[58] Field of Search ...................... 280/202, 204, 280/292, 415.1, 475, 643, 648, 655, 656, 657, 43.17, 47.36, 47.38, 30

[56] References Cited

U.S. PATENT DOCUMENTS

| | | | |
|---|---|---|---|
| 5,020,814 | 6/1991 | George et al. | 280/204 |
| 5,267,788 | 12/1993 | Berry et al. | 280/658 X |
| 5,308,096 | 5/1994 | Smith | 280/204 |
| 5,313,817 | 5/1994 | Meinders | 280/43.17 X |

FOREIGN PATENT DOCUMENTS

| | | | |
|---|---|---|---|
| 4227632 | 2/1994 | Germany | 280/204 |

OTHER PUBLICATIONS

Advertisement by Kiddie Kart Bicycle Trailers, Inc. for a "new Folding Kiddie Kruiser" (undated).
Advertisement by Chariot Carriers Inc. for a "Cabriolet" bicycle trailer (undated).
Advertisement by Blue Sky Cycle Carts for a Blue Sky Cycle Cart (undated).
Brochure of Tri Industries, Inc. for an Aerocruiser bike trailer and stroller and Huffy Town–n–Stroll (undated).
Advertisement for Burley–Roo bicycle trailer (undated).
Advertisement of Outillage de Precision Drummond Inc. for the Orby bicycle trailer (undated).
Advertisement of Kiddie Kart International for Kiddie Kart bicycle trailer (undated).
Advertisement of S. Winchester's Originals, Inc. for The Runner Kit (undated).
Copy of advertisement of Winchester bicycle trailer (undated).

*Primary Examiner*—Richard M. Camby
*Assistant Examiner*—Victor E. Johnson
*Attorney, Agent, or Firm*—D. Doak Horne

[57] ABSTRACT

A convertible trailer for towing behind a bicycle, the trailer being convertible between a trailer and a stroller. The trailer possesses a chassis frame, comprising a generally rectangular outer frame member having a front frame member, a rear frame member, and two side frame members. A tow bar is pivotally mounted to the trailer, pivotal between a towing position extending forwardly of the chassis frame, and a stroller position extending upwardly of the chassis frame. Releasible securement means is further provided for securing the tow bar in the towing position and in the stroller position. A second pair of wheels are pivotably mounted on the chassis frame. Each are pivotable between a retracted position when the tow bar is in the towing position, and an extended position forward of the first pair of wheels for travel on the ground when the tow bar is in the stroller position.

10 Claims, 4 Drawing Sheets

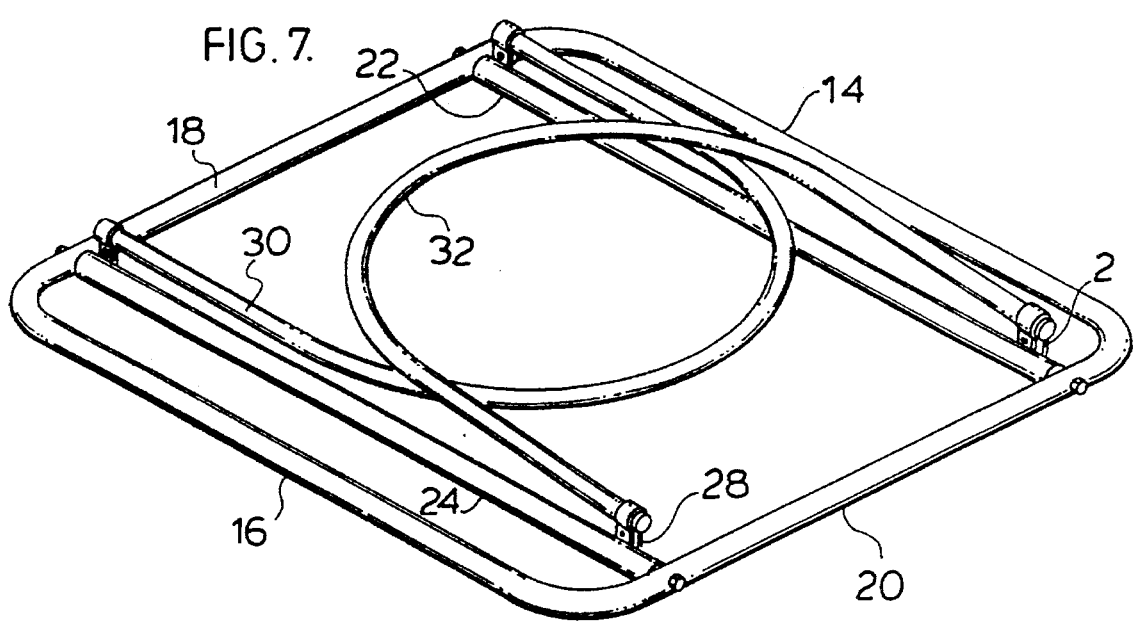

BICYCLE TRAILER

FIELD OF INVENTION

This invention relates to a trailer for attachment to a bicycle and, more particularly, relates to a bicycle trailer which is convertible between a trailer and a stroller, which possesses a pair of retractable wheels may together be simultaneously retracted and extended.

BACKGROUND OF THE INVENTION

Cycling has become increasingly popular in recent times as a form of exercise and recreation. Cyclists are commonplace on today's roads and many cities have defined bicycle trails for road bicycles and off-road or mountain bicycles.

Cycling has also become a common family activity. An infant can accompany a parent by being placed in an infant seat above the rear tire of the parent's bicycle. Infant seats, however, are not of sufficient size to accommodate older children who are not yet old enough to ride their own bicycle. This presents a problem for the parent or family who desires to cycle as a family activity.

Bicycle trailers allow these children to accompany the adults while cycling. A bicycle trailer attaches to the bicycle and is generally of sufficient size to allow two small children to be placed therein. Groceries and other items may be carried in the bicycle trailer either with a child or alone. Thus, bicycle trailers provide many advantages to the cyclist who is a parent and to any cyclist who desires to transport items by bicycle.

U.S. Pat. No. 5,020,814 to George et al. discloses a collapsible bicycle trailer having a tongue or tow bar 75 which is pivotally attached to the chassis frame of the trailer for pivoting between a folded position beneath and adjacent the chassis frame and an extended position in front of the chassis frame (ref. col. 5, lines 25–30). The tow bar is locked in the extended position by a U-shaped clip and a pin.

Notably, to avoid injury to the children, it is important for a trailer which is convertible between a bicycle trailer and a stroller that the device be very stable, particularly in the stroller position where the bicycle is not present and the device is by pushed as a stroller, as opposed to being pulled by a bicycle.

A number of prior art devices for trailers exist. Of these, one of the most relevant is U.S. Pat. No. 5,308,096 to Smith which discloses a bicycle trailer which has a pivotable towing bar which is pivotable from a forwarding and horizontally extending towing position to an upwardly and rearwardly extending stroller position to convert the trailer to a stroller. Front wheel or wheels 52 pivot downwardly into a ground engaging condition when towing bar 28 is pivoted into the stroller position (see FIG. 5 and Col. 4, lines 50–55). Problematically, however, this design disclosed in U.S. Pat. 5,308,096 in the stroller position is essentially only supported at three points, first point being at the point of contact of the front wheel or wheels 52 at the forward end of the vehicle centrally of the vehicle, the second and third points of contact with the ground being respectively at the spaced apart two rear wheels 22. As such, the convertible trailer in the stroller position is inherently less stable than if it were supported at four spaced-apart, independent locations. Such patent does not disclose any manner of retracting a spaced-apart second pair of wheels, located on mutually opposite sides of the chassis frame of the bicycle trailer, and clearly does not disclose or teach any manner of retracting a spaced-apart pair of wheels where the towing bar is pivotably coupled to the frame chasis of the bicycle trailer proximate to and/or preferably at the axis or axle about which the rear (larger) pair of wheels rotate. Towing bars of prior art devices such as Smith, which are pivotably coupled to the trailer more forwardly of the trailer than the rear wheels typically (when rotated upwardly and rearwardly approximately 135° from a substantially forwardly facing horizontal position to an inclined, rearwardly facing position as a stroller handle) are of insufficient length to allow proper use as a stroller handle. Conversely, prior art towing bars if simply made longer result in the trailer being towed by the bicycle at a larger distance, making manoevering of the bicycle-trailer combination more difficult.

Clearly lacking in the prior an is a compact bicycle trailer design which provides for two pairs of wheels, the second pair being spaced apart and being extendible when in the stroller position to provide a stable stroller device having a towing bar of serviceable length, and when in the trailer position having a pivotable towing bar of a compact length to provide a manoeverable bicycle-trailer combination.

SUMMARY OF THE INVENTION

In order to overcome the disadvantage of the prior art, the present invention provides for a bicycle trailer which is convertible between a trailer and a stroller and which has two pairs of wheels for stability. The second pair of wheels pivots to a retracted position avoiding contact with the ground when the trailer is in the trailer position to thereby increase manoeverability of the bicycle and trailer combination. When the trailer is in the stroller position, the second pair of wheels extend so as to contact the ground to eliminate any resultant moment which would otherwise be applied to the tow bar by the weight of children in the trailer, thereby alleviating the strain in operating the stroller and increasing the stability of the stroller as it is being pushed. An inordinately long tow bar which would otherwise be necessary when the trailer is converted to the stroller position is avoided by providing that the tow bar be pivotably coupled to the trailer proximate the axis of rotation of the main trailer wheels.

Accordingly, in one broad aspect of the present invention, the invention comprises a convertible trailer for towing behind a bicycle, which is convertible between a trailer configuration and a stroller position. The trailer possesses a chassis frame, consisting of a generally rectangular outer frame member having a front frame member, a rear frame member, and two side members. A first pair of wheels are mounted on the chassis frame, each journalled for rotation about an axle, and aligned parallel to the direction of intended travel of such wailer. A tow bar is pivotably affixed at one end thereof proximate an axle of one of the first pair of wheels, and is pivotable between a towing position extending substantially horizontally and forwardly of the chassis frame, and a stroller position extending upwardly at an inclined angle to the horizontal. Releasible securement means are further provided for releasibly securing the tow bar in the towing position and in the stroller position. A second pair of wheels are also provided, each rotatably journalled on a respective link-arm member of a pair of first link-arm members. Each first link-arm member is pivotably mounted to the chassis frame and is coupled to the tow bar. Advantageously, each of the first link-arm members together with corresponding second wheels are simultaneously pivotable, to allow the second wheels to be moved from a first retracted position when the tow bar is in the towing position, to a second extended position allowing contact of each of the two second wheels on the ground when the tow bar is in the stroller position.

In a preferred embodiment of the present invention, each of the first pair of link-arm members:

(i) have at one end thereof a respective one of the second wheels rotatably journalled thereon;

(ii) are each pivotably coupled proximate a mid-point thereof to the chassis frame; and (iii) are pivotably coupled at an opposite end to the tow bar, wherein movement of the tow bar from the towing position to the stroller position causes the first pair of link-arm members to be pivotably rotated about the point of pivotable coupling to the chassis frame, causing their associated second wheels to move from the retracted position to the extended position.

In yet another aspect of the invention, the tow bar is fixedly coupled to a rotatable shaft, which extends transversely from one side of the trailer to the other, along a common axis on which each of the first wheels are mounted. Pivotable movement of the tow bar and thus rotation of the rotatable shaft to which it is affixed causes pivoting of the first link-arm members, thereby causing retraction or extension of the second pair of wheels. By having the tow bar pivotable about an axis proximate an axle of the first (rear) wheels of the trailer, an inordinately long tow bar is avoided when the conversion to the stroller configuration is made.

Accordingly, in a further preferred embodiment, the present invention comprises:

a chassis frame, consisting of a generally rectangular outer frame member having a front frame member, a rear frame member, and two side frame members;

a rear pair of wheels mounted on said chassis frame, each journalled for rotation about an axle and aligned parallel to the direction of intended travel of said trailer;

a tow bar pivotably affixed at one end thereof to a rotatable shaft, said shaft located proximate said axle and extending transversely across said trailer from one side frame member to said other side frame member, said tow bar pivotable between a towing position extending substantially horizontally and forwardly of said chassis frame and a stroller position extending upwardly and rearwardly;

releasible securement means for releasibly securing said tow bar in said towing position and in said stroller position; and a front pair of wheels, rotatably journalled on a respective link-arm member of a pair of first link-arm members, each first link-arm member, (i) having at one end thereof and rotatably journalled thereon a respective one of said front pair of wheels;

(ii) pivotably coupled proximate a mid-point thereof to said chassis frame;

(iii) pivotably coupled at an opposite end to a respective member of a second pair of link-arm member; and each member of said second pair of link-arm members adapted to force said first link-arm members to rotate to thereby retract said front pair of wheels to said retracted position when said tow bar and rotatable shaft are pivotably rotated to said towing position, and further adapted to force said first pair of link-arm members to rotate to thereby extend said from pair of wheels into said extended position when said tow bar and rotatable shaft are pivotably rotated to said stroller position.

BRIEF DESCRIPTION OF THE DRAWINGS

Further embodiments will be apparent from the following detailed description of the invention, when considered together with the accompanying drawings, in which:

FIG. 7 is a perspective view of the ends of the trailer body portion collapsed upon the chassis frame.

DETAILED DESCRIPTION OF THE PREFERRED EMBODIMENT

Figure 1:
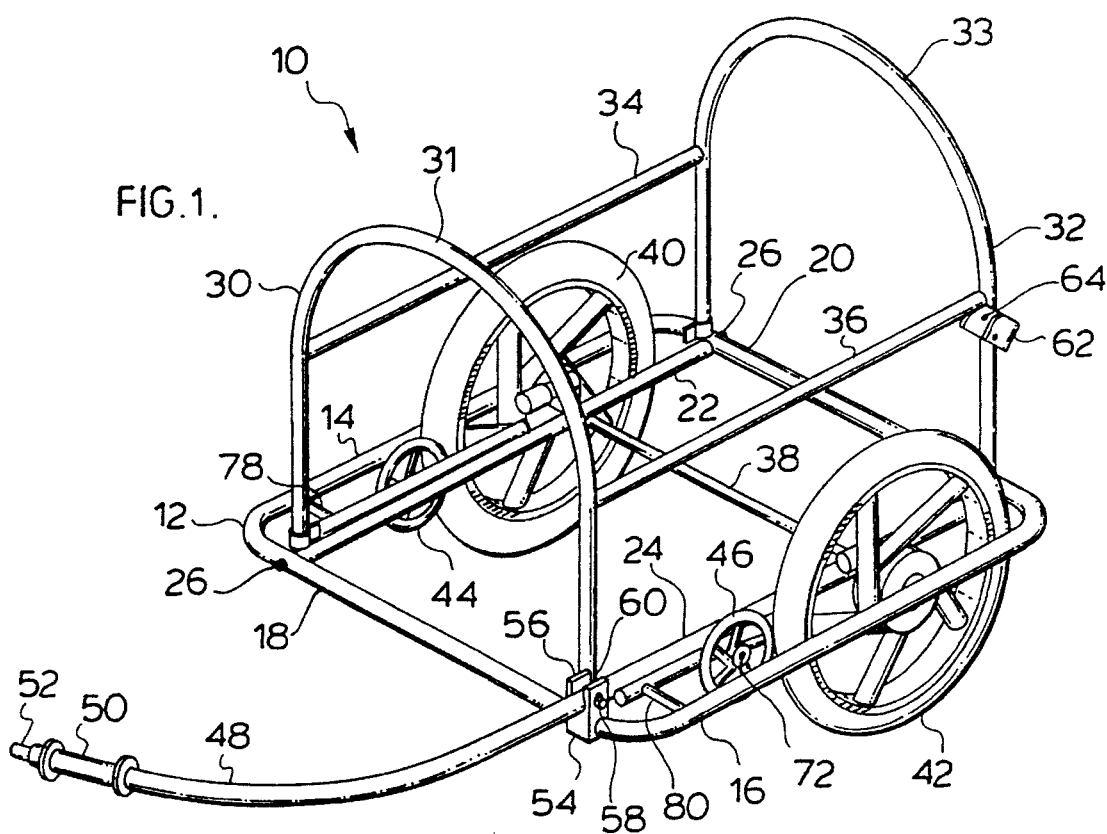
FIG. 1 is an isometric cut-away view of a preferred embodiment of the bicycle trailer of the present invention, in the trailer position.

Referring firstly to FIG. 1, the bicycle trailer of the present invention is depicted as 10 and is shown in its towing position. Bicycle trailer 10 has a substantially rectangular tubular chassis frame with rounded corners 12 having longitudinal side members 14 and 16 and transverse members 18 and 20 interconnecting the longitudinal side members 14 and 16. Spaced apart longitudinal side frame members 22 and 24 are substantially parallel to the longitudinal side members 14 and 16 respectively and are located inwardly within the plane of the chassis frame 12 in proximity to the longitudinal side members 14 and 16 to define a space therebetween. The positioning of longitudinal member 22 creates a space between it and longitudinal side member 14. In the same manner, the positioning of longitudinal member 24 creates a space between it and longitudinal side member 16.

The longitudinal members 22 and 24 are attached to the transverse members 18 and 20 by bolts 26. Bolts 26 are inserted through apertures (not shown) in transverse members 18 and 20 and threaded into longitudinal members 22 and 24.

Semicircular ends 30 and 32 are hingeably coupled to opposite ends of longitudinal members 22 and 24 by hinges 28. Each are pivotable from a first fully open position as shown in FIG. 1, to a second portable closed position, as shown in FIG. 7, wherein each are folded downward onto the plane of the chassis frame 12 and longitudinal members 22 and 24 in a substantially mutually overlying relationship. The hinges 28 are offset to prevent pivoting of the hinges beyond ninety degrees when in the fully open position.

It will be understood that biasing mechanisms may be used to urge the ends into the open or closed position. Biasing means (not shown) may also likewise be incorporated to bias the ends 30 and 32 into the vertical (open) position or into the folded (collapsed) position.

Strut members 34 and 36 are removably attached to the ends 30 and 32 and are spaced apart and generally parallel to the longitudinal members 22 and 24.

Rotatable shaft or axle 38 is disposed between the longitudinal members 22 and 24 and the side members 14 and 16 at aligned positions. The shaft 38 is located approximately two-thirds of the distance from transverse member 18 to transverse member 20 and is journalled for rotation between the longitudinal members 22 and 24 and the side members 14 and 16.

A first pair of wheels 40 and 42 are each independently rotatably journalled to the longitudinal members 14,22 and 16,24 respectively. Any commercially available wheels will suffice as long as they are of appropriate diameter to fit between the space between the longitudinal members and the side members. The first pair of wheels 40 and 42 must also allow for the placement of a second pair of wheels 44 and 46 within the space between the longitudinal members and the side members. The second pair of wheels 44 and 46 are of diameter than the first pair of wheels 40 and 42 and are shown in their retracted state in FIG. 1 adjacent longitudinal members 22 and 24. When the second pair of wheels 44 and 46 are in their retracted state, they do not have any contact with the first pair of wheels 40 and 42 thereby allowing rotation of wheels 40 and 42.

A tubular tow bar 48 is affixed to the rotation shaft 38 between the wheel 42 and the longitudinal member 24. The tow bar 48 projects parallel to and above longitudinal member 24 beyond transverse member 18 and curves inward. A generally cylindrical handle 50 is located at the distal end of the tow bar 48. Further up the tow bar 48 is a pin 52 which is used to connect the bicycle trailer 10 to a bicycle. A hitch (not shown) may be provided to attach the bicycle trailer 10 to a bicycle. Any hitch common in the art may be used.

The tow bar 48 is maintained in the towing position by releasible detent member 54. The detent member 54 is shown enlarged in FIG. 1. The detent member 54 is affixed to transverse member 18 in alignment with the tow bar 48. The detent member 54 has a recess 56 for receiving the tow bar 48. A pin 58 is inserted through the recess 56 and through an aperture (not shown) in the tow bar 48 to maintain the tow bar 48 in the towing position. The pin 58 is lockable for maintaining it within the aperture contained in the tow bar 48. A wire 60 locks the pin 56 in place.

Figure 2:
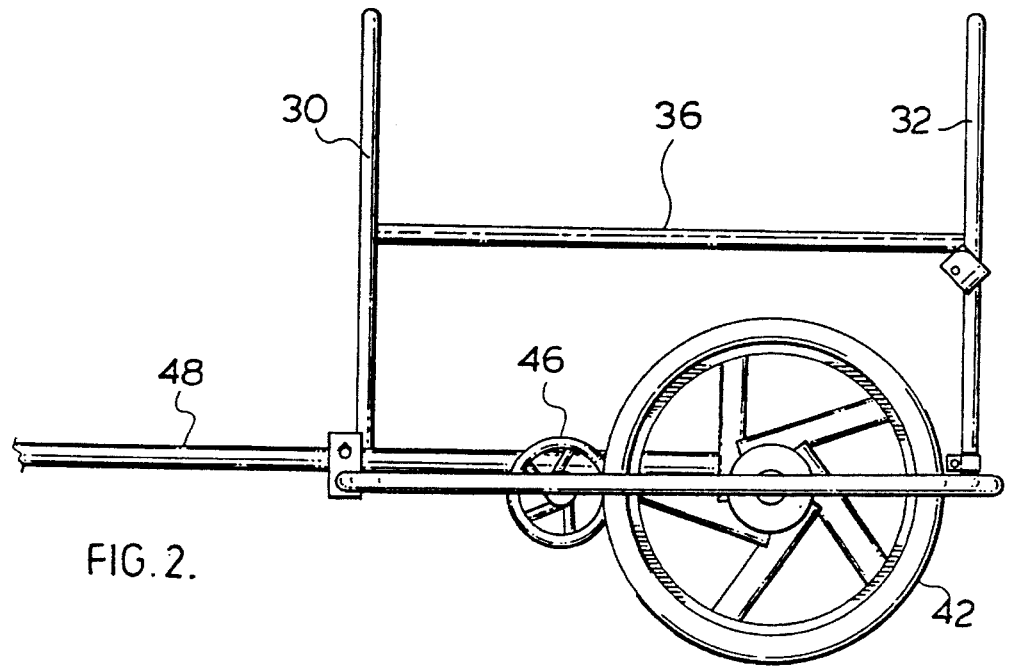
FIG. 2 is a side elevational view of the bicycle trailer in the trailer position.

FIG. 2 shows another views of the bicycle trailer 10 in the towing position.

Figure 3:
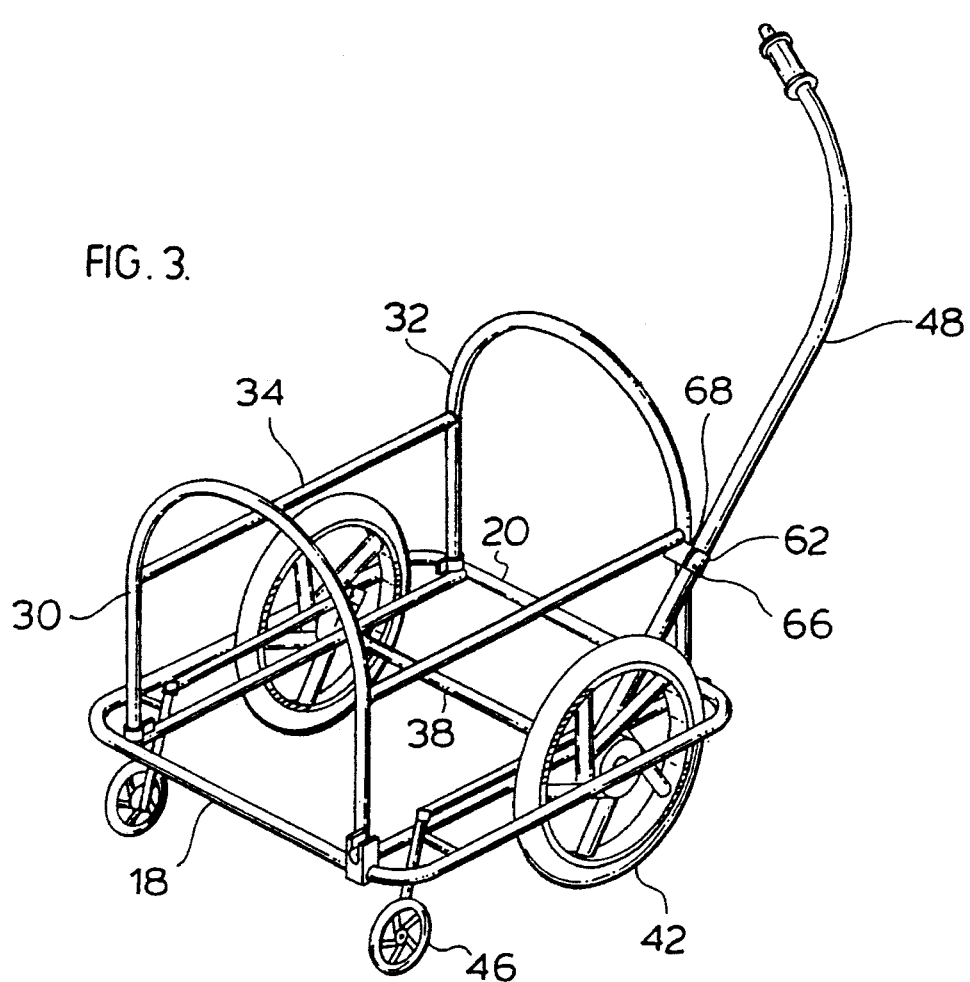
FIG. 3 is an isometric cut-away view of the bicycle trailer of the invention in the stroller position.
Figure 4:
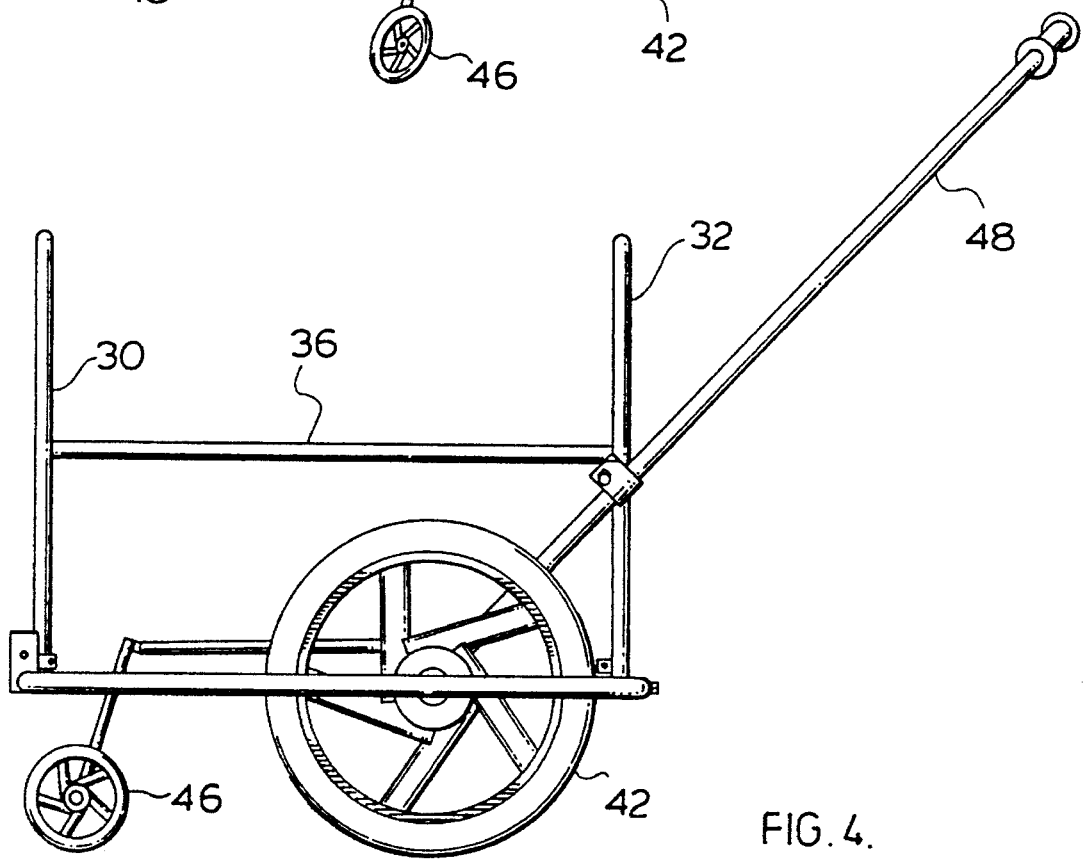
FIG. 4 is a side elevational view of the bicycle trailer of the invention in the stroller position.
Figure 5:
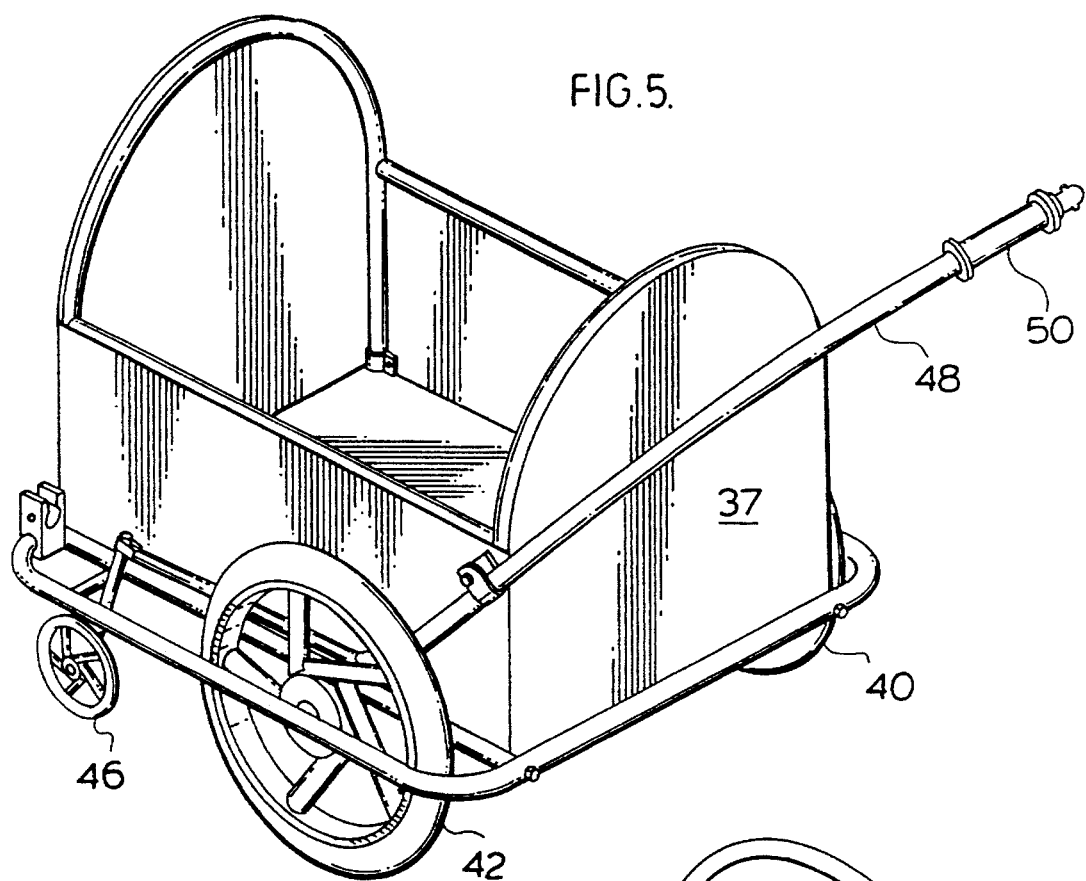
FIG. 5 is a perspective view of the bicycle trailer in the stroller position with the flexible sheet forming walls about the trailer body portion.

FIGS. 3, 4, and 5 show the bicycle trailer 10 in the stroller position. The second pair of wheels 44 and 46 have been pivoted from their retracted position as shown in FIG. 1 to their extended position. Tow bar 48 has been disengaged from the detent member 54 to allow for the pivotal movement of it. The tow bar 48 has been pivoted from the towing position as shown in FIG. 1 to the stroller position of FIG. 4 wherein the tow bar 48 is locked in place by detent member 62. Detent member 62 is affixed to the end 32 and is of the same configuration as detent member 54 except the recess 64 is deeper than the recess 56 of the detent member 54. The tow bar 48 fits within the recess 64 of the detent member 62 and is held in place by pin 66. A wire 68 acts as further support for the containment of the tow bar 48 within the detent member 62. The user of the bicycle trailer 10 may now push the trailer 10 by exerting pressure on the handle 50 for use of the trailer 10 as a stroller.

The ends 30 and 32 and strut members 34 and 36 cooperate to support a flexible sheet 37 above the frame 12 when the bicycle trailer is in its towing position, thereby forming a plurality of walls, as shown in FIG. 5. The flexible sheet 37 can be comprised of any number of materials but in a preferred embodiment is of a lightweight nylon mesh or netting. A removable second flexible sheet may be placed over the semi-circular tops 31 and 33 of the ends 30 and 32 respectively to provide a cover for a child or items placed within the bicycle trailer 10. The second flexible sheet 39 may cover the tops 31 and 33 of the bicycle trailer 10 and overlap the outer sides of linkages 34 and 36. Seats and safety belts (not shown) may be provided within the bicycle trailer 10 for children carried therein. Groceries and other items may also be carried within the bicycle trailer 10.

Figure 6:
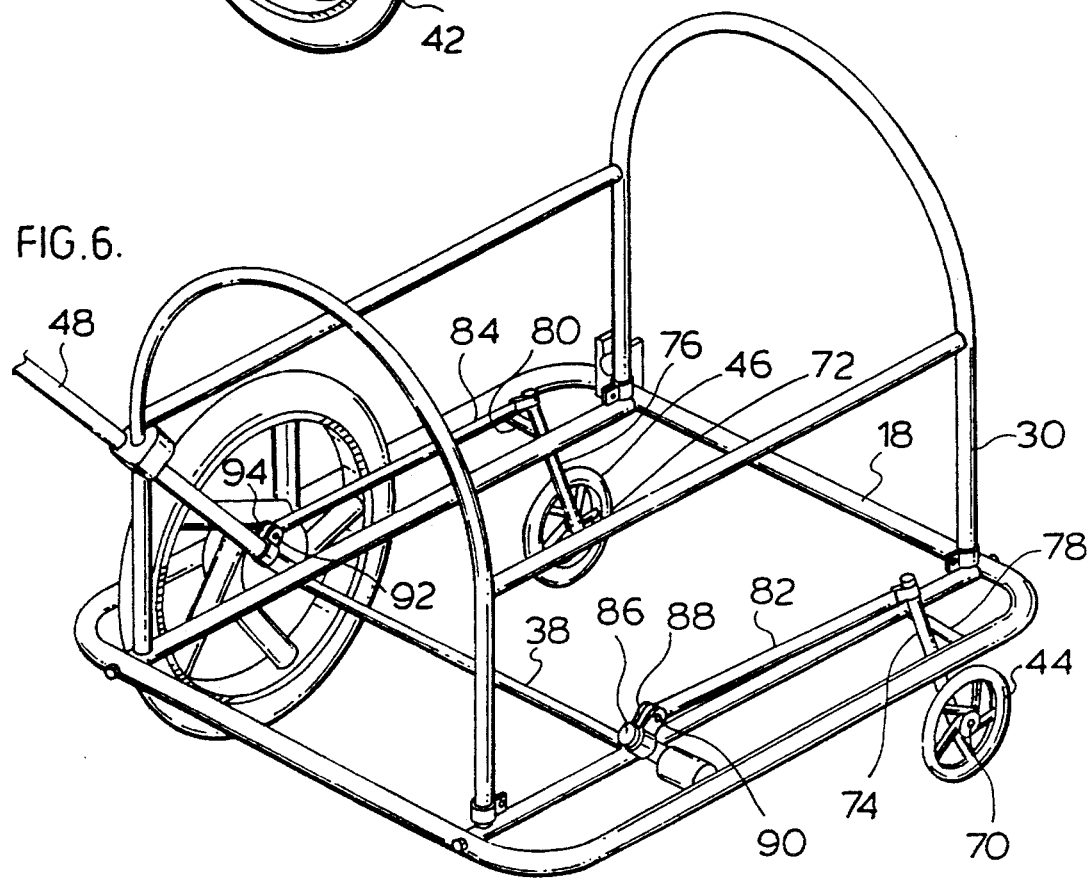
FIG. 6 is a cut-away isometric view of the bicycle trailer in the stroller position with a wheel missing.

FIG. 6 shows the connection of the second pair of wheels 44 and 46 to a rotatable shaft 38, which is co-axial to the axis of rotation of rear wheels 40 and 42, on their respective axles (not shown). The wheels 44 and 46 are journalled for rotation about pins 70 and 72 respectively. The pins 70 and 72 are attached to rods 74 and 76 respectively which depend upwardly from the wheels 44 and 46 when the bicycle trailer 10 is in the stroller position. Support members 78 and 80 are located between the longitudinal members 22 and 24 and the side members 14 and 16. The support members 78 and 80 are inserted through apertures in the link-arm members 74 and 76 (not shown). The link-arm members 74 and 76 are pivotally coupled to link-arm members 82 and 84 respectively and pivot about support members 78 and 80 when the bicycle trailer 10 is converted between a trailer and a stroller.

The link-arm member 82 is pivotally coupled to stud 86 which is located between the wheel 40 and longitudinal member 22, on rotatable shaft 38. A bracket 88 surrounds the stud 86 and pivotally couples the link-arm member 82 thereto through the use of a pin 90.

The link-arm member 84 is pivotally coupled to the tow bar 48. A pin 92 and a bracket 94 attach the link-arm member 84 to the tow bar 48. The bracket 94 surrounds the tow bar 48.

With reference to FIG. 7, semicircular ends 30 and 32 may be pivoted onto the plane of the chassis frame 12. Each end 30 and 32 is pivotable towards each other once the removable linkages 34 and 36 have been removed. In the preferred embodiment, when the ends 30 and 32 are collapsed onto the plane of the chassis frame 12, the top sections 31 and 33 of the ends 30 and 32 do not extend beyond transverse members 18 and 20. This provides the important advantage of easier storage of the bicycle trailer.

In the preferred embodiment, all components of the bicycle trailer 10 are steel.

Pivoting of Second Pair of Wheels

The pivoting of the second pair of wheels 44 and 46 and the tow bar 48 from the trailer position to the stroller position will now be described with reference to FIGS. 1, 3 and 6.

The wire 60 and the pin 58 are disengaged from detent member 54. The tow bar 48 may now be pivoted from the towing position. As the tow bar 48 is pivoted upward, the rotatable shaft 38 is rotated. This action pivots the stud 86 at the same time as the tow bar 48 is being pivoted. The pivoting of the tow bar 48 pulls the link-arm members 82 and 84 rearward and in the direction toward the rear frame member 20. At the same time, the wheels 44 and 46 pivot about support members 78 and 80 respectively, downward from the plane of the chassis frame 12 to engage the ground. In this manner, the wheels 44 and 46 may provide support for the bicycle trailer 10 proximate the transverse member 18 when the bicycle trailer 10 is in the stroller position. The tow bar 48 is rotated approximately 135 degrees so as to serve as a stroller handle to allow the trailer to be used as stroller and pushed forwardly (see FIG. 4).

The present invention provides a number of advantages. Children may accompany a parent on cycling activities through the use of a bicycle trailer. After arriving at the destination, the bicycle trailer is then converted to a stroller thereby providing a convenient device for transporting children to a destination by bicycle and transporting the children by foot around the destination. The body portion of the bicycle trailer may be collapsed upon the chassis frame to provide for easy storage of the bicycle trailer.

It will be understood that modifications can be made in the embodiments of the invention described herein without departing from the scope and purview of the invention as defined by the appended claims.

I claim:

1. A convertible trailer for towing behind a bicycle, said convertible trailer being convertible between a trailer configuration and a child stroller configuration comprising:

a chassis frame, having a generally rectangular outer frame member having a front frame member, a rear frame member, and two side frame members;

a first pair of wheels mounted on said chassis frame, each journalled for rotation about an axle and aligned parallel to the direction of intended travel of said trailer;

a tow bar pivotably affixed at one end thereof to said chassis frame proximate an axle of one of said first pair of wheels, pivotable between a towing position extending substantially horizontal forwardly of said chassis frame, and a stroller position extending upwardly at an inclined angle to the horizontal;

releasible securement means for releasibly securing said tow bar in said towing position and in said stroller position;

a second pair of wheels, rotatably journalled on a respective link-arm member of a pair of first link-arm members, each first link-arm member pivotably mounted to said chassis frame and coupled to said tow bar;

each of said second pair of wheels and first link-arm members being simultaneously pivotable from a first retracted position when said tow bar is in said towing position, to a second extended position to allow contact of each of said second pair of wheels on the ground when said tow bar is in said stroller position.

2. The convertible trailer as claimed in claim 1, said first pair of link-arm members:

(i) having at one end thereof and rotatably journalled thereon a respective one of said second pair of wheels;

(ii) pivotably coupled proximate a mid-point thereof to said chassis frame;

(iii) pivotably coupled at an opposite end to said tow bar; wherein movement of said tow bar from said towing position to said stroller position causes said first pair of link-arm members to be each simultaneously pivotably rotated about their respective points of pivotable coupling to said chassis frame, thereby causing their respective second wheels to move from said retracted position to said extended position.

3. The convertible trailer as claimed in claim 2, further comprising:

a second pair of link-arm members, interposed respectively between said first link-arm members and said tow bar, each at one end thereof pivotably coupled to a respective member of said first pair of link arm members and at an other end thereof to said tow bar.

4. A convertible trailer as claimed in claim 1, further comprising:

front and rear canopy-support members, extending perpendicularly upwardly from said front and rear frame members respectively, aligned parallel to each other and disposed transversely to said direction of travel when said trailer is in an assembled position, each hingeably coupled at respective ends to said chassis frame so as to be pivotable about an axis perpendicular to said direction of travel so as to allow pivotable fold of said canopy-support members onto a substantially horizontal plane when in a collapsed position;

a pair of strut support members, located on mutually opposite sides of said trailer when in said assembled position and aligned parallel to each other, each releasibly coupled at one end thereof to said front canopy member, and at an opposite end thereof to said rear canopy member, each releasibly detachable at said ends from said front and rear canopy-support members to allow collapsible folding thereof;

each of said canopy-support members and said strut members adapted to support flexible sheet means to thereby form a plurality of walls to thereby form an enclosure for the trailer.

5. A convertible trailer for towing behind a bicycle, said convertible trailer being convertible between a trailer configuration and a child stroller configuration, comprising:

a chassis frame, having a generally rectangular outer frame member having a front frame member, a rear frame member, and two side frame members;

a rear pair of wheels mounted on said chassis frame, each journalled for rotation about an axle and aligned parallel to the direction of intended travel of said trailer;

a tow bar pivotably affixed at one end thereof to a rotatable shaft, said shaft located proximate one of said axles and extending transversely across said trailer from one side frame member to said other side frame member, said tow bar pivotable between a towing position mending substantially horizontally and forwardly of said chassis frame and a stroller position extending upwardly and rearwardly;

releasible securement means for releasibly securing said tow bar in said towing position and in said stroller position; and a front pair of wheels, rotatably journalled on a respective link-arm member of a pair of first link-arm members, each first link-arm member;

(i) having at one end thereof and rotatably journalled thereon a respective one of said front pair of wheels;

(ii) pivotably coupled proximate a mid-point thereof to said chassis frame;

(iii) pivotably coupled at an opposite end thereof to a respective member of a second pair of link-arm members; and each member of said second pair of link-arm members adapted to force said first link-arm members to rotate to thereby retract said front pair of wheels to said retracted position when said tow bar and rotatable shaft are pivotably rotated to said towing position, and further adapted to force said first pair of link-arm members to rotate to thereby extend said front pair of wheels into said extended position when said tow bar and rotatable shaft are pivotably rotated to said stroller position.

6. The convertible trailer as claimed in claim 5, each of said rear pair of wheels journalled for rotation about a common axis, said common axis being co-axial with said rotatable shaft extending transversely across said trailer.

7. A convertible trailer for towing behind a bicycle, said convertible trailer being convertible between a trailer configuration and a child stroller configuration, comprising:

a chassis frame, having a generally rectangular outer frame member having a front frame member, a rear frame member, and two side frame members;

a first pair of wheels mounted on said chassis frame, each journalled for rotation about a common axis extending therebetween and each aligned parallel to the direction of intended travel of said trailer;

a tow bar pivotably affixed at one end thereof to a rotatable shaft located co-axial with said common axis, said tow bar pivotable between a towing position extending substantially horizontally and forwardly of said chassis frame, and a stroller position extending upwardly at an inclined angle to the horizontal;

releasible securement means for releasibly securing said tow bar in said towing position and in said stroller position; and a second pair of wheels, rotatably journalled on a respective link-arm member of a pair of first link-arm members, each first link-arm member pivotably mounted to said chassis frame and coupled to said tow bar.

8. The convertible trailer as claimed in claim 7, said first pair of link-arm members:

(i) having at one end thereof and rotatably journalled thereon a respective one of said second pair of wheels;

(ii) pivotably coupled proximate a mid-point thereof to said chassis frame;

(iii) pivotably coupled at an opposite end to said tow bar; wherein movement of said tow bar from said towing position to said stroller position causes said first pair of link-arm members to be each simultaneously pivotably rotated about their respective points of pivotable coupling to said chassis frame, thereby causing their respective second wheels to move from said retracted position to said extended position.

9. The convertible trailer as claimed in claim 8, further comprising:

a second pair of link-arm members, interposed respectively between said first link-arm members and said tow bar, each at one end thereof pivotably coupled to a respective member of said first pair of link arm members and at an other end thereof to said tow bar.

10. A convertible trailer as claimed in claim 7, further comprising:

front and rear canopy-support members, extending perpendicularly upwardly from said front and rear frame members respectively, aligned parallel to each other and disposed transversely to said direction of travel when said trailer is in an assembled position, each hingeably coupled at respective ends to said chassis frame so as to be pivotable about an axis perpendicular to said direction of travel so as to allow pivotable fold of said canopy-support members onto a substantially horizontal plane when in a collapsed position;

a pair of strut support members, located on mutually opposite sides of said trailer when in said assembled position and aligned parallel to each other, each releasibly coupled at one thereof to said front canopy member, and at an opposite end thereof to said rear canopy member, each releasibly detachable at said ends from said front and rear canopy-support members to allow collapsible folding thereof;

each of said canopy-support members and said strut members adapted to support flexible sheet means to thereby form a plurality of walls to thereby form an enclosure for the trailer.

* * * * *